E. P. BASCH AND F. WOODALL.
DEVICE FOR HOLDING AND CENTERING TOOLS FOR LATHES, &c.
APPLICATION FILED OCT. 6, 1919.
1,354,715.
Patented Oct. 5, 1920.
2 SHEETS—SHEET 1.
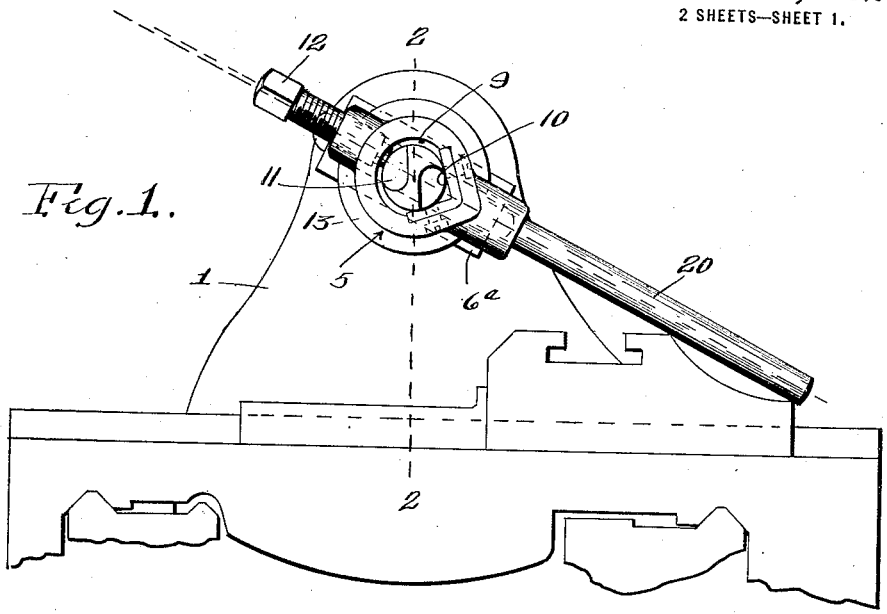
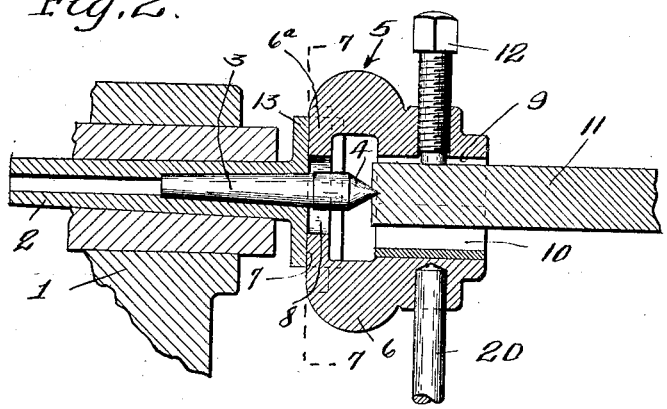
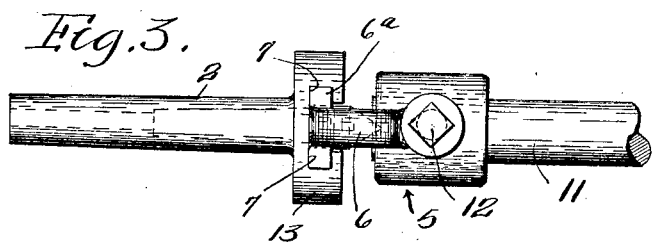
INVENTORS
Edward P. Basch and
Frank Woodall
BY
Parsons & Bodell
ATTORNEYS.

E. P. BASCH AND F. WOODALL.
DEVICE FOR HOLDING AND CENTERING TOOLS FOR LATHES, &c.
APPLICATION FILED OCT. 6, 1919.
1,354,715.
Patented Oct. 5, 1920.
2 SHEETS—SHEET 2.
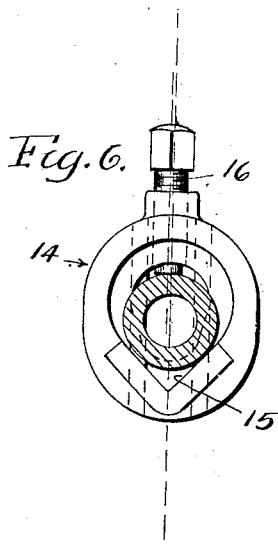
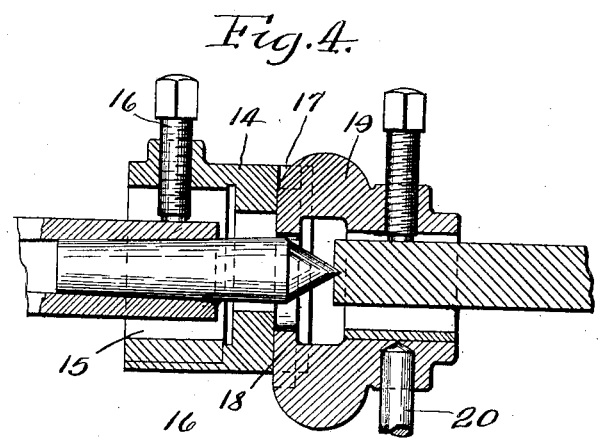
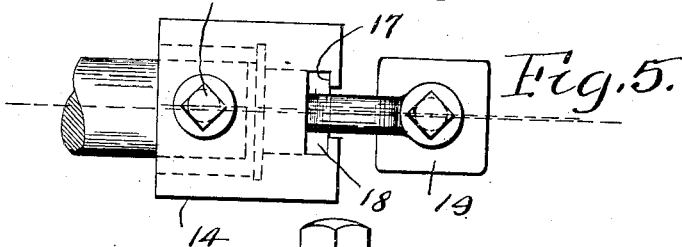
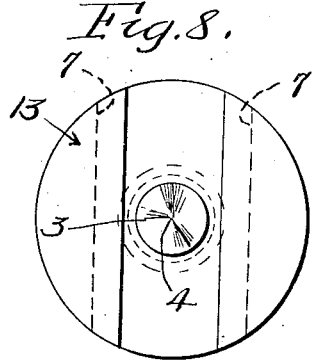
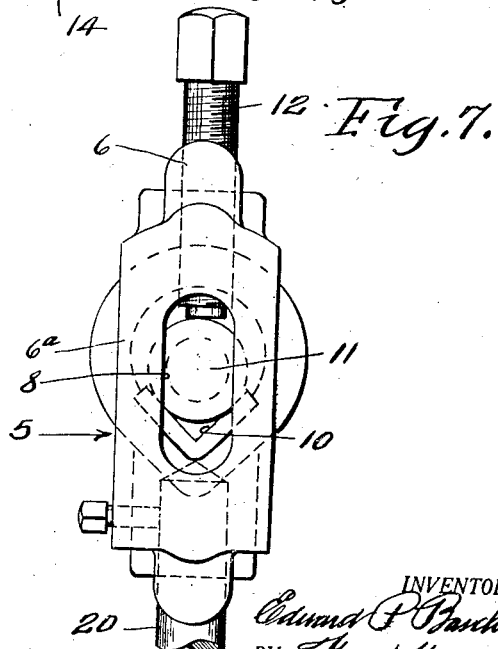

UNITED STATES PATENT OFFICE.

EDWARD P. BASCH AND FRANK WOODALL, OF SYRACUSE, NEW YORK.

DEVICE FOR HOLDING AND CENTERING TOOLS FOR LATHES, &c.

1,354,715.  Specification of Letters Patent.  Patented Oct. 5, 1920.

Application filed October 6, 1919. Serial No. 328,665.

*To all whom it may concern:*

Be it known that we, EDWARD P. BASCH and FRANK WOODALL, citizens of the United States, and residents of Syracuse, in the county of Onondaga and State of New York, have invented a certain new and useful Device for Holding and Centering Tools for Lathes, etc., of which the following is a specification.

This invention has for its object a particularly simple and efficient device for holding and centering a tool, as a boring tool or reamer relatively to the tail stock spindle of a lathe, or to any other spindle, which device is particularly simple in construction, highly efficient and durable in use; and it consists in the features and in the combinations and constructions hereinafter set forth and claimed.

In describing this invention, reference is had to the accompanying drawings, in which like characters designate corresponding parts in all the views.

Figure 1 is an end view of one form of our attachment, the same being shown as mounted upon the tail stock spindle of a lathe, the contiguous part of the bed of the lathe being also shown.

Fig. 2 is an enlarged sectional view on line 2—2, Fig. 1.

Fig. 3 is a plan view, looking downwardly, of parts seen in Fig. 2, parts being omitted.

Figs. 4 and 5 are respectively a sectional view and a plan view, similar to Figs. 2 and 3 of another form of our invention.

Fig. 6 is an enlarged end view looking to the left in Fig. 4.

Fig. 7 is a view taken on the plane of line 7—7, Fig. 2, parts being omitted.

Fig. 8 is a face view of the sleeve member mountable on the lathe spindle.

This holding and centering device for tools comprises generally a body connected to the spindle of a lathe or similar machine, so as to slide radially relatively thereto and having a passage arranged in front of its sliding connection, which passage receives the tool, the body being formed with an elongated bearing face extending lengthwise of said passage, said face being arranged at a right angle to the radial movement of the body, and means for clamping the tool against the said face, with the socket at its inner end receiving the conical point of the center of the spindle, so that when the tool is clamped against said face, the body is moved radially as the tool finds its bearing the entire length of the bearing face, the socket during such movement seating accurately on the conical point of the center and sliding the body radially.

We have here shown our invention as applied to a tail stock spindle of a lathe.

In the drawing, 1 designates the tail stock, 2 the tail stock spindle having the usual center 3 provided with a conical point 4.

5 designates the tool holder, which is connected to the spindle 2 to slide radially relatively thereto.

As here shown, it is formed with a yoke 6 having a bar 6ª connecting the yoke arms, the bar extending through ways 7 extending diametrically of the tail stock spindle 2. The bar 6ª is formed with a slot 8 through which the spindle 3 extends. The body is also formed with a passage 9 alined with the center 3 and slot 8, and with a bearing face, as the V-shaped face 10 on one side of the passage 9, this face 10 extending at a right angle to the radial movement of the body 5.

This bearing face is elongated so that when the tool 11 is pressed firmly against the same, the tool is held in a straight line. The tool 11 is pressed or clamped against the face 10 by any suitable means, as a clamping screw 12 threading into the body and into the passage 9, between the ends thereof, the screw 12 bearing on the inner end of the tool 11 at one side of the center thereof as shown in Figs. 1 and 7.

The tool is formed with a socket at its inner end which receives the conical point 4 of the center and owing to its eccentric position, the screw 12 tends to move the tool 11 axially toward the conical point 4, and hence while the screw 12 is being tightened, and the tool 11 pressed on the face 10, the body 5 is being shifted radially by reason of the engagement of the conical point 4 in the socket at the inner end of the tool 11, and thus the tool 11 is brought into axial alinement with the tail stock spindle.

In Figs. 1, 2 and 3, the tail stock spindle is formed with a head 13 in which the guides 7 are formed. However, in Figs. 4 to 6 inclusive, these guides are formed in a member attachable to, and separable from, the tail stock spindle.

In Figs. 4 to 6, 14 designates a member attachable to the tail stock spindle, the member 14 being shown as a sleeve formed with an internal lengthwise V-shaped bearing face 15 for engaging the tail stock spindle on one side thereof, and having a clamping means, as a screw 16, for pressing against the opposite side of the tail stock spindle and firmly clamping the member 14 on to the said spindle, this member 14 is formed at its outer end with diametrically extending ways 17 which receive the yoke bar 18 of the body 19 of the tool holding device, this body 19 of the tool holding device is practically the same as the body 5 of Figs. 1, 2 and 3.

The body is provided with a radially extending arm 20, Fig. 1, for engaging any part of the machine or lathe and prevent rotation of the tool holder.

In operation, the device is attached to the spindle and the tool placed therein, the tool 11 usually having a conical hole at its inner end, and the tool is placed so that this hole receives the conical point 4 of the center 3. The clamping screw 12 is then tightened and presses the tool 11 flat against the face 10, and during this movement, the body 5 or 19 of the device is moved radially, and when the tool 11 is firmly clamped against the face 10 it is in exact alinement with the center 3.

What we claim is:

1. The combination of the spindle having a center formed with a conical point and a tool having a socket in one end for receiving the point, of means for holding the tool and alining the same with the spindle comprising a body mounted on and slidable radially relatively to the spindle and having means for holding a tool having a conical socket at one end with such socket receiving the conical point of the center, substantially as and for the purpose described.

2. The combination of the spindle having a center formed with a conical point and a tool having a socket at one end for receiving the point, of means for holding the tool and alining the same with the center comprising a body having means for engaging the spindle and slidable radially relatively thereto, the body having a passage for the tool and means for clamping the tool in the passage, with the socket thereof receiving the conical point of the center, substantially as and for the purpose specified.

3. The combination of the spindle having a center formed with a conical point and a tool having a socket at one end for receiving the point, of means for holding and centering the tool relatively to said spindle comprising a body having means for engaging the spindle to slide radially relatively thereto, the body also having a passage provided with a bearing face for the tool, said face extending at a right angle to the radial movement of the body, and means for clamping the tool against said face, with the socket at its inner end receiving the conical point of the spindle, substantially as and for the purpose set forth.

4. The combination of the spindle having a center formed with a conical point and a tool having a socket at one end for receiving the point, of means for holding and centering the tool relatively to said spindle comprising a member mountable on the spindle and a body connected to said member to slide radially relatively to the center, the body being also formed with a passage having a bearing face on one side thereof arranged at a right angle to the radial movement of the body, said passage receiving the tool and means for clamping the tool against said face, with the socket at its inner end receiving the conical point, substantially as and for the purpose described.

5. The combination of the spindle having a center formed with a conical point and a tool having a socket at one end for receiving the point, of means for holding and centering the tool relatively to the point comprising a sleeve member provided with means for attachment to the spindle and guides extending radially relatively to said spindle, a body formed with a yoke having a bar connecting the arms of the yoke, said bar being movable in said guide and having a slot through which the center extends, the body being also formed with a passage in front of the center formed with an elongated surface arranged at a right angle to the radial movement of the body, and means for clamping a tool against said surface with the socket at its inner end receiving the conical point of the center, substantially as and for the purpose specified.

6. The combination of the spindle having a center formed with a conical point, and a tool having a socket in one end for receiving the conical point, the center having means associated therewith which is formed with a radially extending guide located on opposite sides of the spindle; of means for holding and centering a tool relatively to the spindle comprising a body having a yoke having a bar connecting the arms of the yoke, the bar being slidable in the guides and formed with a slot through which the center extends, the body also having a passage in front of the slot and an elongated bearing face at one side of said passage arranged at a right angle to the radial movement of the body, and means for clamping a tool against said bearing face with the socket in its inner end receiving the conical point of the center, substantially as and for the purpose set forth.

7. The combination of the spindle having a center formed with a conical point, and a tool having a socket in one end for receiving the point, of an attachment for holding and centering a tool relatively to the lathe spindle comprising a sleeve member mountable on the lathe center and formed with an internal lengthwise bearing face and with means for clamping the bearing face of said sleeve member against said center, the sleeve being also formed with a radially extending guide on opposite sides of the lathe spindle, a body formed with a yoke having a bar connecting the yoke arms and movable in the guides, the bar being formed with a slot through which the center extends, said body being also formed with a passage having an elongated bearing face on one side thereof in front of the slot, the bearing face being arranged at a right angle to the radial movement of the body, and means for clamping the tool against said bearing face with its inner end receiving the conical point of the spindle, substantially as and for the purpose described.

In testimony whereof, we have hereunto signed our names at Syracuse, in the county of Onondaga, and State of New York, this 29th day of September, 1919.

EDWARD P. BASCH.
FRANK WOODALL.